(12) United States Patent
Kim et al.

(10) Patent No.: US 10,831,860 B2
(45) Date of Patent: Nov. 10, 2020

(54) ALIGNMENT TECHNIQUES TO MATCH SYMMETRY POINT AS ZERO-WEIGHT POINT IN ANALOG CROSSPOINT ARRAYS

(71) Applicant: International Business Machines Corporation, Armonk, NY (US)

(72) Inventors: Seyoung Kim, White Plains, NY (US); Hyungjun Kim, Nam (KR); Tayfun Gokmen, Briarcliff Manor, NY (US); Malte Rasch, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 8 days.

(21) Appl. No.: 16/158,056

(22) Filed: Oct. 11, 2018

(65) Prior Publication Data

US 2020/0117699 A1    Apr. 16, 2020

(51) Int. Cl.
   *G06F 17/16* (2006.01)
(52) U.S. Cl.
   CPC .................... *G06F 17/16* (2013.01)
(58) Field of Classification Search
   CPC ........ G06N 3/06; G06N 3/063; G06N 3/0635; G06F 17/16; G11C 13/0002–0097; G11C 7/006; G11C 7/06; G11C 11/54; G11C 16/0483
   See application file for complete search history.

(56) References Cited

U.S. PATENT DOCUMENTS

| | | | |
|---|---|---|---|
| 6,502,083 B1 | 12/2002 | Louis et al. | |
| 6,956,765 B2 | 10/2005 | Saito et al. | |
| 8,712,940 B2 | 4/2014 | Modha | |
| 9,779,355 B1 | 10/2017 | Leobandung | |
| 9,852,790 B1 | 12/2017 | Gokmen et al. | |
| 10,387,778 B2 * | 8/2019 | Gokmen | G06N 3/08 |
| 2015/0170025 A1 * | 6/2015 | Wu | G06N 3/0445 706/25 |
| 2017/0109626 A1 | 4/2017 | Gokmen et al. | |

(Continued)

OTHER PUBLICATIONS

T. Gokmen et al., Acceleration of Deep Neural Network Training with Resistive Cross-Point Devices: Design Considerations, Front. Neurosci,.,2016 (Year: 2016).*

(Continued)

*Primary Examiner* — Andrew Caldwell
*Assistant Examiner* — Emily E Larocque
(74) *Attorney, Agent, or Firm* — Randall Bluestone; Michael J. Chang, LLC

(57) ABSTRACT

Zero-shifting techniques in analog crosspoint arrays are provided. In one aspect, an analog array-based vector-matrix multiplication includes: a weight array connected to a reference array, each including a crossbar array having a set of conductive row wires and a set of conductive column wires intersecting the set of conductive row wires, and optimizable crosspoint devices at intersections of the set of conductive column wires and the set of conductive row wires. A method for analog array-based vector-matrix computing is also provided that includes: applying repeated voltage pulses to the crosspoint devices in the weight array until all of the crosspoint devices in the weight array converge to their own symmetry point; and copying conductance values for each crosspoint device from the weight array to the reference array.

18 Claims, 6 Drawing Sheets

(56) References Cited

U.S. PATENT DOCUMENTS

| | | |
|---|---|---|
| 2017/0109628 A1 | 4/2017 | Gokmen et al. |
| 2018/0005115 A1* | 1/2018 | Gokmen et al. |
| 2018/0114569 A1* | 4/2018 | Strachan .............. G11C 7/1012 |
| 2018/0114572 A1 | 4/2018 | Gokmen et al. |
| 2018/0165573 A1 | 6/2018 | Hsu et al. |
| 2018/0253642 A1 | 9/2018 | Gokmen et al. |

OTHER PUBLICATIONS

J Woo et al., Resistive Memory-Based Analog Synapses, The pursuit for linear and symmetric weight update, IEEE Nanotechnology magazine, Sep. 2018 (Year: 2018).*

H. Kim, et al., Zero-shifting Technique for Deep Neural Network Training on Resistive Cross-point Arrays, arXiv:1907.10228, 2019 (Year: 2019).*

T. Gokmen et al., "Acceleration of Deep Neural Network Training with Resistive Cross-Point Devices: Design Considerations," Frontiers in Neuroscience, vol. 10, Article 333, Jul. 2016, 13 pages.

Stefano Fusi et al., "Limits on the memory storage capacity of bounded synapses," Nature Neuroscience, vol. 10, No. 4, Apr. 2007, pp. 485-493.

Kim et al., "Analog CMOS-based Resistive Processing Unit for Deep Neural Network Training," 2017 IEEE 60th International Midwest Symposium on Circuits and Systems (MWACAS), (Aug. 2017) (4 pages).

* cited by examiner

US 10,831,860 B2

ALIGNMENT TECHNIQUES TO MATCH SYMMETRY POINT AS ZERO-WEIGHT POINT IN ANALOG CROSSPOINT ARRAYS

FIELD OF THE INVENTION

The present invention relates to neuromorphic computing, and more particularly, to alignment techniques to match symmetry point as zero-weight point in analog crosspoint arrays for improving neural network performance.

BACKGROUND OF THE INVENTION

A neural network can be embodied in an analog crosspoint array of resistive devices such as the resistive processing units (RPUs) described in U.S. Patent Application Publication Number 2017/0109628 by Gokmen et al., entitled "Resistive Processing Unit" (hereinafter "U.S. Patent Application Publication Number 2017/0109628"), the contents of which are incorporated by reference as if fully set forth herein. As described in U.S. Patent Application Publication Number 2017/0109628, each RPU includes a first terminal, a second terminal and an active region. A conduction state of the active region identifies a weight value of the RPU, which can be updated/adjusted by application of a signal to the first/second terminals.

However, it has been found that such resistive devices can be unbalanced. Namely, when voltage pulses are applied stepwise to adjust the weight up or down, the amount of weight update (i.e., the size of the steps) is linearly dependent on the current weight value. Thus, there is an imbalance between up and down adjustments, which needs to be accounted for.

Accordingly, improved techniques for operating analog crosspoint arrays with shifting for weight update imbalances to enhance neural network performance would be desirable.

SUMMARY OF THE INVENTION

The present invention provides zero-shifting techniques in analog crosspoint arrays for improving neural network performance. In one aspect of the invention, an analog array-based vector-matrix multiplication is provided. The analog array-based vector-matrix multiplication includes: a weight array connected to a reference array, each including a crossbar array having a set of conductive row wires and a set of conductive column wires intersecting the set of conductive row wires, and optimizable crosspoint devices at intersections of the set of conductive column wires and the set of conductive row wires.

In another aspect of the invention, a method for analog array-based vector-matrix computing is provided. The method includes: providing a weight array connected to a reference array, each including a crossbar array having a set of conductive row wires and a set of conductive column wires intersecting the set of conductive row wires, and crosspoint devices at intersections of the set of conductive column wires and the set of conductive row wires; applying repeated voltage pulses to the crosspoint devices in the weight array until all of the crosspoint devices in the weight array converge to their own symmetry point; and copying conductance values for each crosspoint device from the weight array to the reference array.

A more complete understanding of the present invention, as well as further features and advantages of the present invention, will be obtained by reference to the following detailed description and drawings.

DETAILED DESCRIPTION OF PREFERRED EMBODIMENTS

In machine learning and cognitive science, artificial neural networks (ANNs) are a family of statistical learning models inspired by the biological neural networks of animals, and in particular the brain. ANNs may be used to estimate or approximate systems and cognitive functions that depend on a large number of inputs and weights of the connections which are generally unknown.

ANNs are often embodied as so-called "neuromorphic" systems of interconnected processor elements that act as simulated "neurons" that exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons which may be activated by the pixels of an input image. After being weighted and transformed by a function determined by the network's designer, the activations of these input neurons are then passed to other downstream neurons, which are often referred to as "hidden" neurons. This process is repeated until an output neuron is activated. The activated output neuron determines which character was read.

Instead of utilizing the traditional digital model of manipulating zeros and ones, ANNs create connections between processing elements that are substantially the functional equivalent of the core system functionality that is being estimated or approximated. For example, IBM's SyNapse computer chip is the central component of an electronic neuromorphic machine that attempts to provide similar form, function and architecture to the mammalian brain. Although the IBM SyNapse computer chip uses the same basic transistor components as conventional computer chips, its transistors are configured to mimic the behavior of neurons and their synapse connections. The IBM SyNapse computer chip processes information using a network of just over one million simulated "neurons," which communicate with one another using electrical spikes similar to the synaptic communications between biological neurons. The IBM SyNapse architecture includes a configuration of processors (i.e., simulated "neurons") that read a memory (i.e., a simulated "synapse") and perform simple operations. The communications between these processors, which are typically located in different cores, are performed by on-chip network routers.

Figure 1:
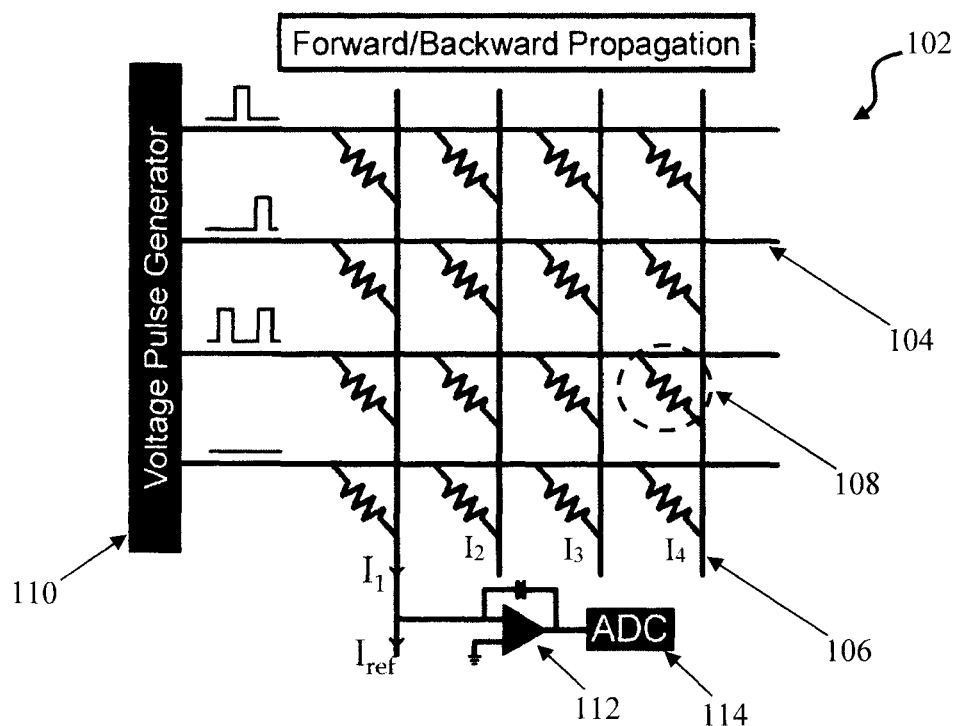
FIG. 1 is a diagram illustrating a crossbar array having a set of conductive row wires and a set of conductive column wires formed to intersect the set of conductive row wires, and resistive devices at the intersections between the two sets of wires according to an embodiment of the present invention.

As shown in FIG. 1, the neural network can be embodied in a crossbar array 102 that includes a set of conductive row wires 104 (row) and a set of conductive column wires 106 (column) formed to intersect the set of conductive row wires. The intersections between the two sets of wires are separated by resistive devices 108 (also referred to herein as crosspoint devices), such as the resistive processing units (RPUs) described in U.S. Patent Application Publication Number 2017/0109628. As described in U.S. Patent Application Publication Number 2017/0109628, each RPU can include a first terminal, a second terminal and an active region. A conduction state of the active region identifies a weight value of the RPU, which can be updated/adjusted by application of a signal to the first/second terminals. Further, three-terminal (or even more terminal) devices can serve effectively as two-terminal resistive memory devices by controlling the extra terminals. For a description of three-terminal RPU devices see, for example, Kim et al., "Analog CMOS-based Resistive Processing Unit for Deep Neural Network Training," 2017 IEEE 60$^{th}$ International Midwest Symposium on Circuits and Systems (MWACAS), (August 2017) (4 pages), the contents of which are incorporated by reference as if fully set forth herein.

The crosspoint devices, in effect, function as the ANN's weighted connections between neurons. Nanoscale two-terminal devices, such as memristors having "ideal" conduction state switching characteristics, are often used as the crosspoint devices in order to emulate synaptic plasticity with high energy efficiency. The conduction state (e.g., resistance) of the ideal memristor material can be altered by controlling the voltages applied between individual wires of the row and column wires. Digital data is stored by alteration of the memristor material's conduction state at the intersection to achieve a high conduction state or a low conduction state. The memristor material can also be programmed to maintain two or more distinct conduction states by selectively setting the conduction state of the material. The conduction state of the memristor material is read by applying a voltage across the material and measuring the current that passes through the target crosspoint device.

As shown in FIG. 1, a voltage pulse generator 110 generates voltage pulses to each row to read the weight values of the individual crosspoint devices by inducing corresponding amount of currents ($I_1$, $I_2$, $I_3$, $I_4$) to the columns. The voltage can be an amplitude-modulation or pulse width modulation signal. This generates what is referred to herein as a "weight matrix" of the crosspoint devices having differing conductance. The output vector from this weight matrix is the current signal ($I_1$, $I_2$, etc.) output from each column that can be read via a current integrator 112 and analog-to-digital converter (ADC) 114. The output currents from the weight matrix are achieving vector-matrix multiplication. As will be described in detail below, once all of the weight elements are programmed to their own symmetry point, then the current readings can be compared with reference array current readings to copy the weights. According to an exemplary embodiment, this matrix is used in a network that is divided into building blocks connected by repeaters, as described for example in U.S. Patent Application Publication Number 2017/0109628. In another exemplary embodiment, the voltage pulse generator 110 is directly controlled by a computer-based apparatus such as that described in accordance with the description of FIG. 11, below, which can also process the output signal $I_1$, $I_2$, etc. from the weight array. This crosspoint array of resistive memory devices can perform a backpropagation algorithm in parallel with large acceleration as compared to central processing unit (CPU)/graphic processing unit (GPU).

Figure 2:
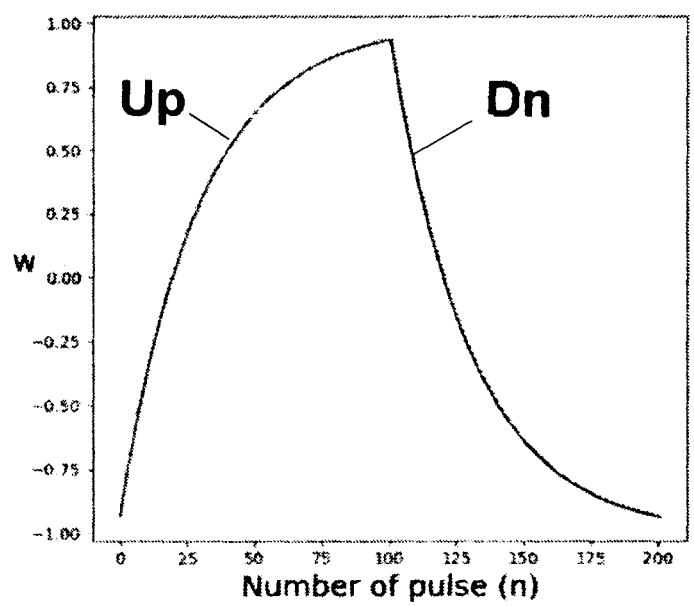
FIG. 2 is a diagram illustrating how resistive devices can be unbalanced according to an embodiment of the present invention.
Figure 3:
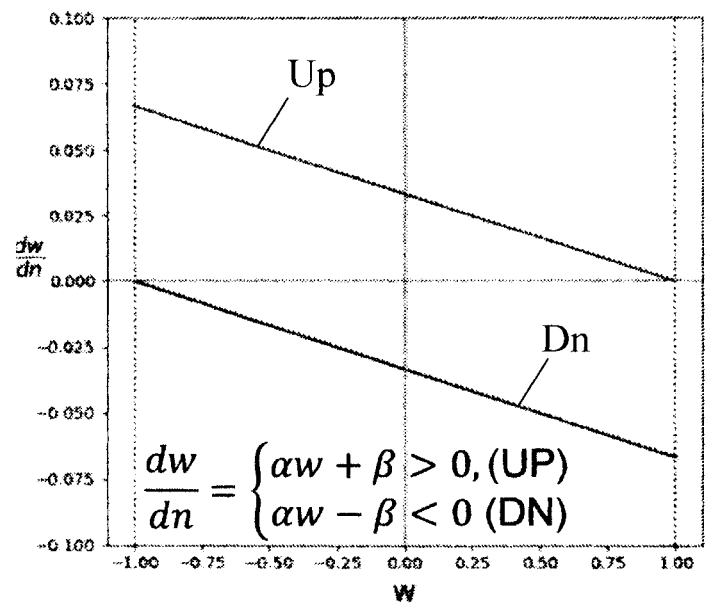
FIG. 3 is a diagram illustrating a device response to up and down pulses that is balanced but not symmetrical according to an embodiment of the present invention.

As highlighted above, it has been found that practical resistive memory devices which are considered as candidates for crosspoint elements in RPU architecture such as resistive random access memory (RRAM) and memristors can be non-linear when the resistance state, and therefore weight value, is updated/programmed. See, for example, FIG. 2 which illustrates weight (w) as a function of the number (n) of up (Up) and down (Dn) voltage pulses. As shown in FIG. 2, when the voltage pulses are applied stepwise to adjust the weight (resistance) up or down, the amount of weight update (i.e., the size of the steps) is linearly dependent on the current weight value. Specifically, referring to the up (Up) pulses, as these pulses are applied stepwise the weight (w) value increases but eventually becomes saturated at the top of the plot. This same saturation behavior occurs with the down (Dn) pulses near the bottom of the plot. Thus, the size of the adjustment steps (up or down) are different depending on the current weight value. The corresponding slopes of these stepwise up/down pulses is shown in FIG. 3. As shown in FIG. 3, the device response to the up and down pulses are balanced, but not symmetrical.

Figure 4:
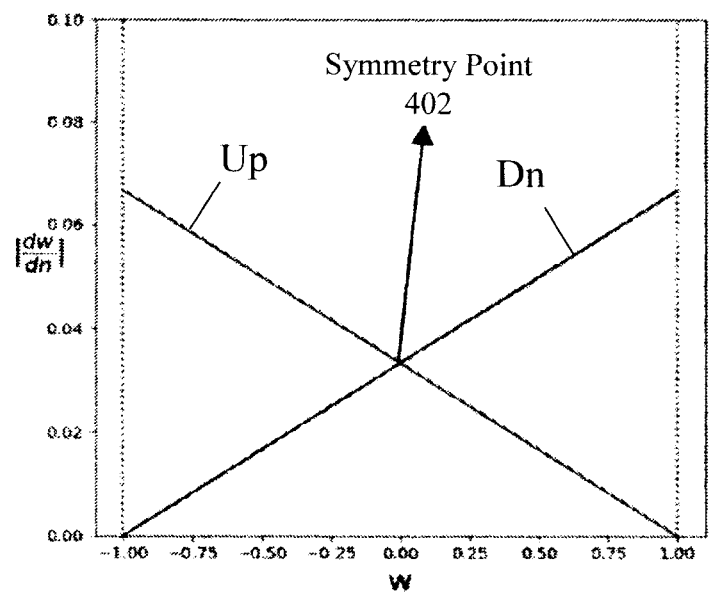
FIG. 4 is a diagram illustrating a single symmetry point where the slopes of the up and down pulses are exactly the same according to an embodiment of the present invention.
Figure 5:
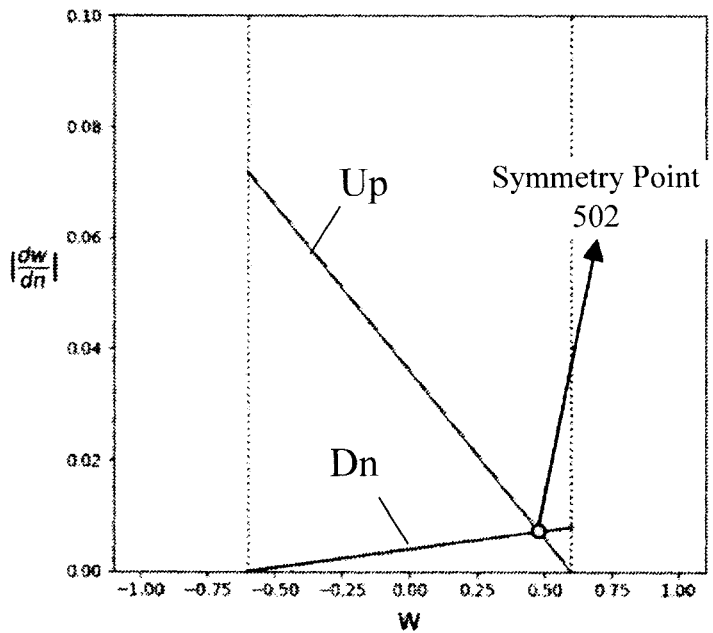
FIG. 5 is a diagram illustrating a case where the symmetry point is biased to one side instead of existing at the middle of the conductance range according to an embodiment of the present invention.

In devices such as RRAM, it has been found herein that there is always one single symmetry point 402 where the slopes of the up and down pulses for each crosspoint device are exactly the same. See FIG. 4. Namely, for each crosspoint device, the size of the up/down steps are unbalanced (see FIG. 2 and FIG. 3) but there is only one symmetry point (see FIG. 4) where the slopes are the same. See also FIG. 5 which depicts an unbalanced case where the abs(slope) of Up and Dn cases are different. Therefore, the symmetry point is biased to one side, instead of existing at the middle.

The point where the weight (w) value is zero, i.e., w=0, for a given resistive memory device is determined by the reference resistance value and this is artificial. For example, if a given resistive memory device can change its conductance G from 0 Ohm$^{-1}$ to 1 Ohm$^{-}$, it is typical to set up a reference resistive memory device at 0.5 Ohm$^{-1}$ since that is the center point of conductance range of the given resistive memory device. When the given resistive memory is balanced, then this will make 0.5 Ohm$^{-1}$ a w=0 point (since 0.5 Ohm$^{-1}$ at weight array device−0.5 Ohm$^{-1}$ at reference device=0), and since symmetry point is at G=0.5 Ohm$^{-1}$, so w=0. However, in practical devices and also due to the device-to-device variation, setting up all of the reference devices at the center point is not effective. Therefore, advantageously, the present techniques automatically compensate for all the devices in the array.

It is notable that even the symmetry point in balanced devices can be at a non-zero weight value because it is determined by how the reference device is set up. For instance, if the device at (1,1) in weight element and corresponding device at (1,1) in reference element are always read together and when they are of same conductance, then weight is zero.

The imbalance between the up and down slopes for a crosspoint device can be quantified using the following update balance factor (BF):

$$BF = \frac{\left|\frac{\Delta w_0^+}{w_{max}}\right| - \left|\frac{\Delta w_0^-}{w_{min}}\right|}{\left|\frac{\Delta w_0^+}{w_{max}}\right| + \left|\frac{\Delta w_0^-}{w_{min}}\right|} \rightarrow \text{normalized difference of absolute slopes} \left(\frac{\Delta w_0^{\pm}}{w_{max/min}}\right)$$

If the balance factor (BF) is not zero, then the strategy to set up the reference array conductance at the center point of the conductance range is no longer the best solution, and the symmetry point will be located at w !=0 point. The non-zero symmetry point devices will affect the network performance. This can be problematic since the BF for crosspoint devices in practice is rarely at the center of the conductance range.

Figure 6:
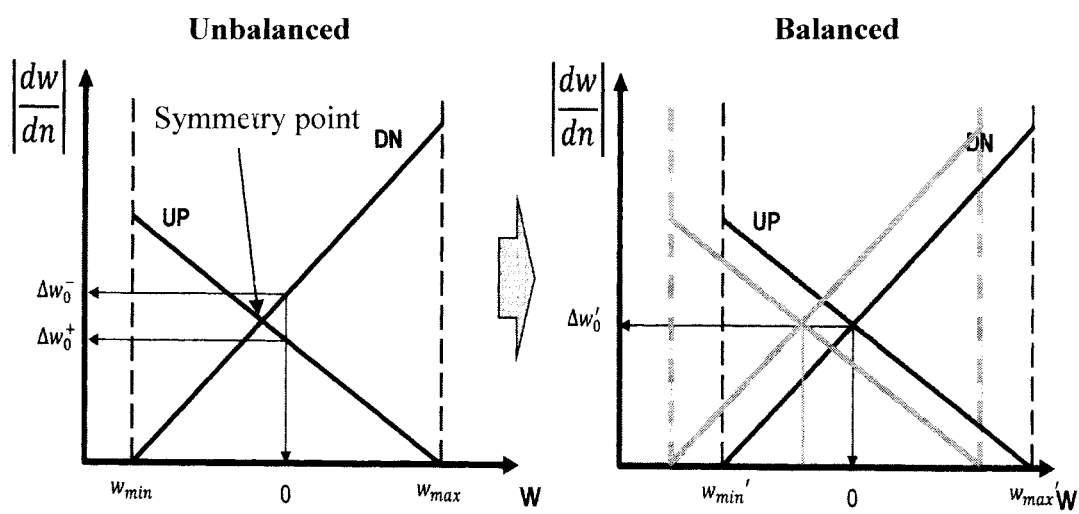
FIG. 6 is a diagram illustrating unbalance having been fixed by subtracting a reference zero-weight value from a reference array to achieve a balanced device according to an embodiment of the present invention.

Advantageously, in accordance with the present techniques, once the symmetry points are found, they will be used as a metric to which the zero weight for each crosspoint device is matched to vastly improve the accuracy of the neural network performance. See, for example, FIG. 6. As shown in FIG. 6, in the unbalanced device shown on the left, because of (up/down) slope differences the symmetry point is not at zero. The unbalance, non-zero BF, causes the symmetry point to be no longer located at the center of the conductance range. The present techniques find the conductance value at the device's symmetry point, and copy it to the corresponding device in the reference array.

Figure 7:
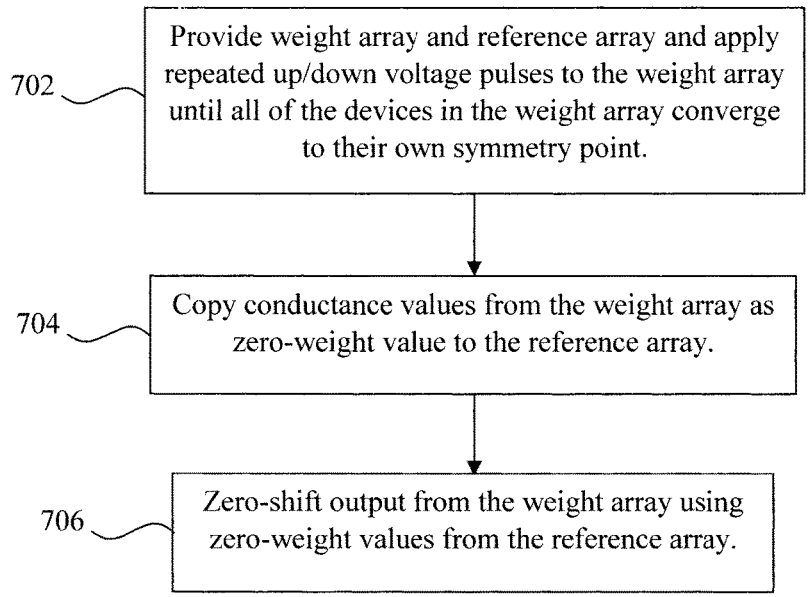
FIG. 7 is a diagram illustrating an exemplary methodology for adjusting the symmetry point as zero-weight point for analog array-based vector-matrix computations such as neural network computation according to an embodiment of the present invention.

An exemplary embodiment of the present techniques is now described by way of reference to methodology 700 of FIG. 7 for adjusting the symmetry point as zero-weight point for analog array-based vector-matrix computations such as neural network computation. As will be described in further detail below, methodology 700 is carried out using two interconnected arrays, one array being the weight array and the other a reference array. Each (weight/reference) array includes a crossbar array that includes a set of conductive row wires (row) and a set of conductive column wires (column) formed to intersect the set of conductive row wires. The intersections between the two sets of wires are separated by resistive crosspoint devices (e.g., RPUs). Notably, the weights of the devices in each (weight/reference) array can be optimized, thereby permitting the weight values obtained from the weight array to be populated to the reference array as described below. Further, there is a one-to-one correlation between the devices in the weight array and reference array such that a unique zero-weight value can be established in each device in the reference array for one corresponding device in the weight array.

In step 702, repeated (first, second, third, etc.) up and down voltage pulses are applied to the crosspoint devices in the weight array until all of the crosspoint devices in the weight array converge to their own symmetry point. For instance, if the conductance range is from Gmin to Gmax, and average delta G at one update incident is dGavg, then the effective number of states in the conductance range is (Gmax−Gmin)/dGavg. When a device is at the extreme points and alternating up/dn pulses are given, then it will take # of updates to reach the center point=(Gmax−Gmin)/dGavg. To ensure the convergence, one can give extra cycles of alternating up/dn pulses, e.g., n×(Gmax−Gmin)/dGavg, where n=1 or larger.

As highlighted above, these up/down voltage pulses (i.e., from a pulse generator) increase/decrease the resistance of the cross-point devices and are applied by generating voltage pulses to each row to update/adjust the weight values of the individual crosspoint devices. In one exemplary embodiment, the up and down voltage pulses are applied repeatedly to each of the crosspoint devices in the weight array in a random manner. For instance, the first voltage pulse applied to a given crosspoint device in the weight array is randomly either an up pulse or a down pulse, the second voltage pulse applied to the same crosspoint device in the weight array is also randomly either an up pulse or a down pulse, and so on. In another exemplary embodiment, the up and down voltage pulses are applied repeatedly to each of the crosspoint devices in the weight array in an alternating manner. For instance, if the first voltage pulse applied to a given crosspoint device in the weight array is an up pulse, then the second voltage pulse applied to the same crosspoint device in the weight array is a down pulse. The third voltage pulse applied to the same crosspoint device would be an up pulse, and so on. The same pattern would apply if the first voltage pulse was a down pulse, i.e., down/up/down, etc.

Once all of the crosspoint devices in the weight array have all converged to their own symmetry point, in step 704 the conductance values for each crosspoint device from the weight array (at the symmetry point) are copied to the reference array. These conductance values copied to the reference array set a zero-weight point in the reference array (Iref) for each corresponding device in the weight array that compensates for the unique imbalance properties in each device in the weight array (as described above). It is notable that the reference array is not programmed during the application. The reference array is initialized by copying the symmetry point values from the weight array but, once the copying is finished, the program reference array isn't programmed. Only the weight array is programmed during neural network training.

During operation, in step 706 the outputs of the crosspoint devices in the weight array are shifted by the zero-weight value from the corresponding devices stored in the reference array. Namely, during operation, the same signal can be provided to both the weight array and the reference array. The output from the crosspoint devices in the weight array (e.g., $I_1$, $I_2$, $I_3$, etc.) can then be zero-shifted by subtracting those values from the output of the corresponding crosspoint devices in the reference array (set to a zero-weight value) to achieve zero-shifted results.

Figure 8:
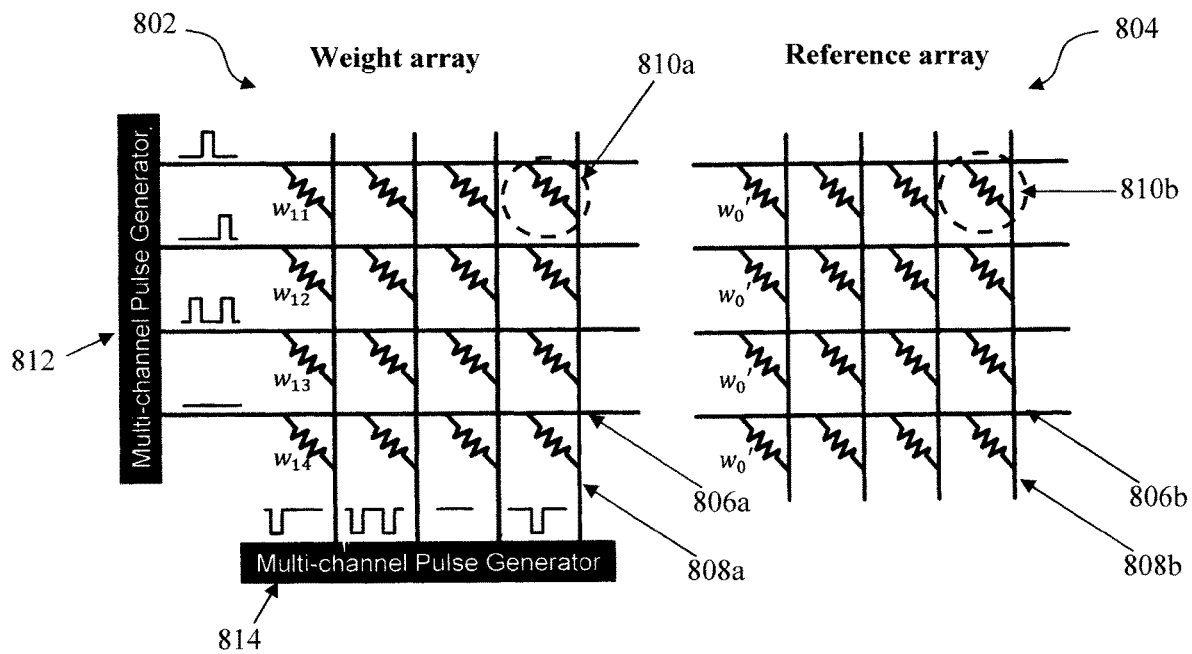
FIG. 8 is a diagram illustrating an exemplary analog array representation of a matrix which uses two arrays (a weight array and a reference array) to express weight values which are positive, negative and zero values by reading the current differentially, and repeated voltage pulses having been applied to the crosspoint devices in the weight array until they all converge to their own symmetry point according to an embodiment of the present invention.
Figure 9:
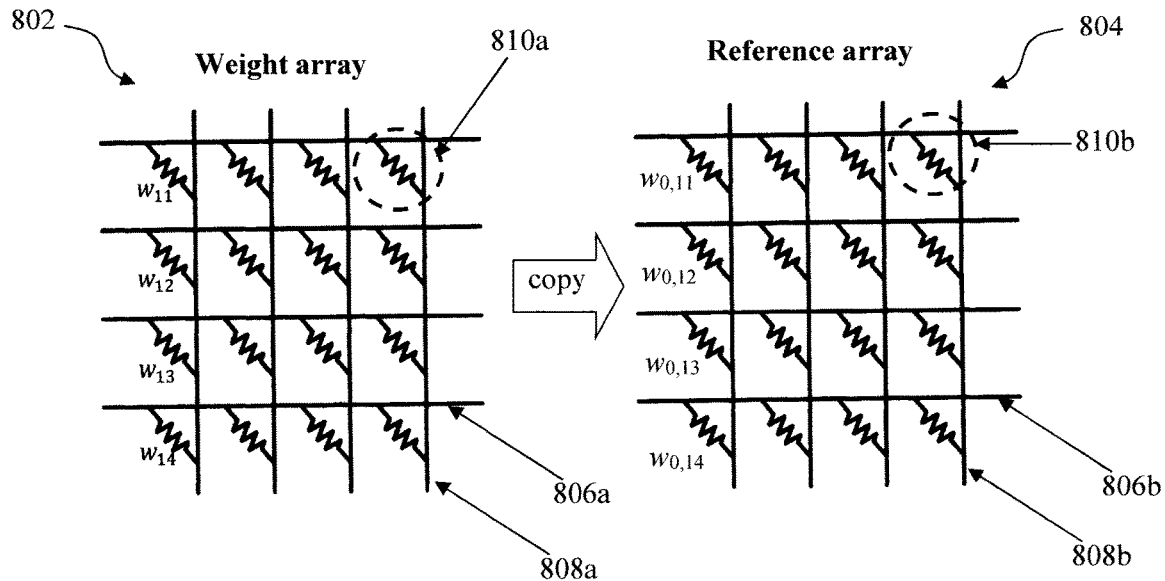
FIG. 9 is a diagram illustrating the conductance values for each crosspoint device from the weight array having been copied to the reference array according to an embodiment of the present invention.
Figure 10:
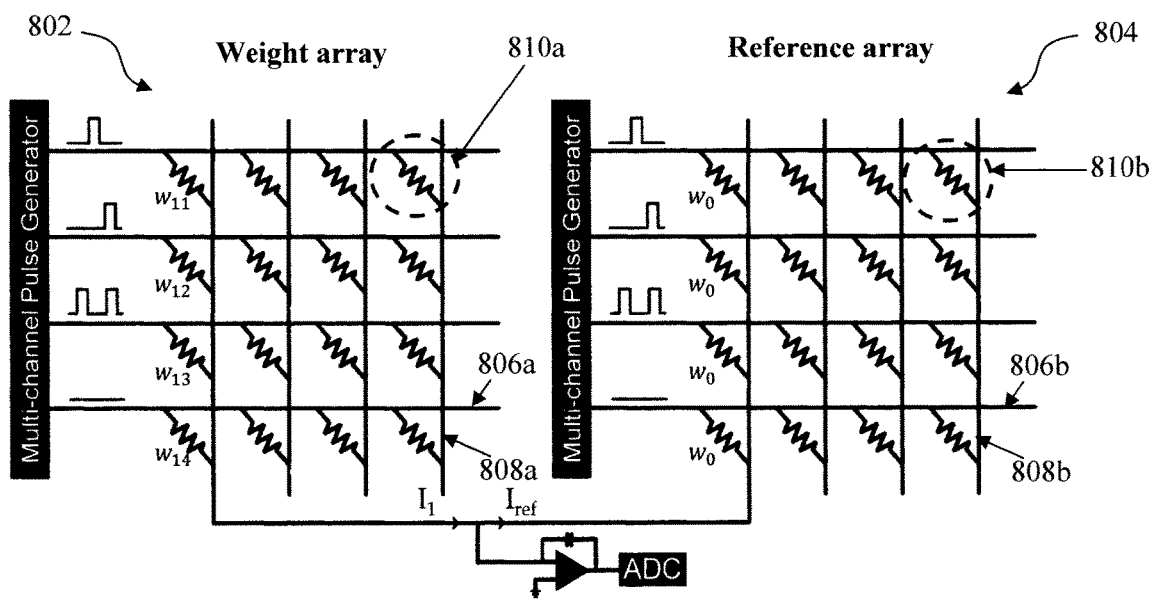
FIG. 10 is a diagram illustrating differential reading by applying identical pulses to the corresponding rows in two arrays and reading out the current according to an embodiment of the present invention.

The steps of methodology 700 are further described by way of reference to the example illustrated in FIGS. 8-10. As shown in FIG. 8, the process is carried out using an analog array-based vector-matrix having two arrays (a weight array and a reference array) to express weight values which are positive, negative and zero values by reading the current differentially. Each (weight/reference) array includes a crossbar array 802/804 that includes a set of conductive row wires 806a,b (row) and a set of conductive column wires 808a,b (column) formed to intersect the set of conductive row wires. The intersections between the two sets of wires are separated by resistive crosspoint devices 810a,b (e.g., RPUs). Thus, as provided above, the weights of the devices 810a,b in each (weight/reference) array can be optimized. As shown in FIG. 8, there is a one-to-one correlation between the devices 810a,b in the weight array and reference array such that a unique zero-weight value can be established in each device 810b in the reference array for one corresponding device 810a in the weight array.

Repeated (first, second, third, etc.) up and down voltage pulses are applied to the crosspoint devices in the weight array (e.g., via multi-channel pulse generators 812 and 814) until all of the crosspoint devices in the weight array converge to their own symmetry point. As provided above, these up/down voltage pulses can be applied in a random manner and/or in an alternating manner.

As shown in FIG. 9, once all of the crosspoint devices in the weight array have all converged to their own symmetry point, the conductance values for each crosspoint device 810a from the weight array (at the symmetry point) are copied to the reference array. As described above, these conductance values copied to the reference array set a zero-weight point when current is read out using the pair of arrays for each corresponding device in the weight array that compensates for the unique imbalance properties in each device 810a in the weight array. As shown in FIG. 10, during operation, differential reading is performed by applying identical pulses to the corresponding rows in two arrays and reading out the current, i.e., by subtracting I1−Iref.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves. electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 11:
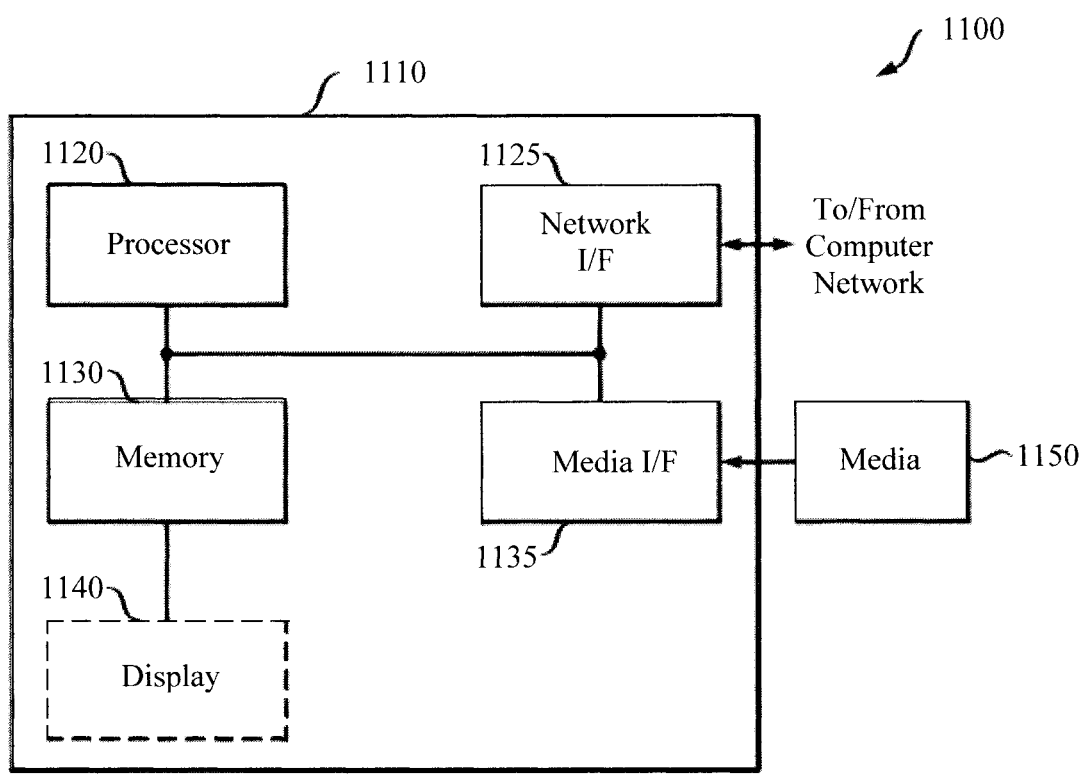
FIG. 11 is a diagram illustrating an exemplary apparatus that can be employed in carrying out one or more of the present techniques according to an embodiment of the present invention.

Turning now to FIG. 11, a block diagram is shown of an apparatus 1100 for implementing one or more of the methodologies presented herein. By way of example only, apparatus 1100 can be configured to control the voltage pulses applied to the arrays via the voltage pulse generators 110, 812, 814, etc. and/or process the output signal I1, I2, etc. from the arrays.

Apparatus 1100 includes a computer system 1110 and removable media 1150. Computer system 1110 includes a processor device 1120, a network interface 1125, a memory 1130, a media interface 1135 and an optional display 1140. Network interface 1125 allows computer system 1110 to connect to a network, while media interface 1135 allows computer system 1110 to interact with media, such as a hard drive or removable media 1150.

Processor device 1120 can be configured to implement the methods, steps, and functions disclosed herein. The memory 1130 could be distributed or local and the processor device 1120 could be distributed or singular. The memory 1130 could be implemented as an electrical, magnetic or optical memory, or any combination of these or other types of storage devices. Moreover, the term "memory" should be construed broadly enough to encompass any information able to be read from, or written to, an address in the addressable space accessed by processor device 1120. With this definition, information on a network, accessible through network interface 1125, is still within memory 1130 because the processor device 1120 can retrieve the information from the network. It should be noted that each distributed processor that makes up processor device 1120 generally contains its own addressable memory space. It should also be noted that some or all of computer system 1110 can be incorporated into an application-specific or general-use integrated circuit.

Optional display 1140 is any type of display suitable for interacting with a human user of apparatus 1100. Generally, display 1140 is a computer monitor or other similar display.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. An analog array-based vector-matrix, comprising:
a weight array connected to a reference array, each comprising a crossbar array having a set of conductive row wires and a set of conductive column wires intersecting the set of conductive row wires, and optimizable crosspoint devices at intersections of the set of conductive column wires and the set of conductive row wires in each of the weight array and the reference array, wherein all of the optimizable crosspoint devices in the weight array are at their own symmetry point.

2. The analog array-based vector-matrix of claim 1, wherein conductance values for each optimizable crosspoint device from the weight array are copied to the reference array.

3. The analog array-based vector-matrix of claim 1, wherein the optimizable crosspoint devices comprise resistive processing units (RPUs).

4. The analog array-based vector-matrix of claim 1, further comprising:
a first voltage pulse generator connected to the set of conductive row wires in the weight array; and
a second voltage pulse generator connected to the set of conductive column wires in the weight array.

5. The analog array-based vector-matrix of claim 1, further comprising:
an analog-to-digital converter (ADC) connected, via a current integrator, to the set of conductive column wires in the weight array.

6. An analog array-based vector-matrix, comprising:
a weight array connected to a reference array, each comprising a crossbar array having a set of conductive row wires and a set of conductive column wires intersecting the set of conductive row wires, and optimizable crosspoint devices at intersections of the set of conductive column wires and the set of conductive row wires in each of the weight array and the reference array,
wherein all of the optimizable crosspoint devices in the weight array are at their own symmetry point, and wherein conductance values for each optimizable crosspoint device from the weight array are copied to the reference array.

7. The analog array-based vector-matrix of claim 6, wherein the optimizable crosspoint devices comprise RPUs.

8. A method for analog array-based vector-matrix computing, the method comprising the steps of:
providing a weight array connected to a reference array, each comprising a crossbar array having a set of conductive row wires and a set of conductive column wires intersecting the set of conductive row wires, and crosspoint devices comprising RPUs at intersections of the set of conductive column wires and the set of conductive row wires in each of the weight array and the reference array;

applying repeated voltage pulses to the crosspoint devices in the weight array until all of the crosspoint devices in the weight array converge to their own symmetry point; and copying conductance values for each crosspoint device from the weight array to the reference array.

9. The method of claim 8, wherein the voltage pulses applied to the crosspoint devices in the weight array comprise up and down voltage pulses.

10. The method of claim 9, wherein the up and down voltage pulses are applied randomly to the crosspoint devices in the weight array.

11. The method of claim 9, wherein the up and down voltage pulses are applied to the crosspoint devices in the weight array in an alternating manner.

12. The method of claim 8, wherein the conductance values copied to the reference array comprise zero-weight values.

13. The method of claim 8, further comprising the step of:
zero-shifting outputs of the weight array by the zero-weight values from the reference array.

14. The method of claim 13, further comprising the steps of:
applying a same signal to both the weight array and the reference array; and
subtracting the output of the weight array from output of the reference array.

15. A method for analog array-based vector-matrix computing, the method comprising the steps of:
providing a weight array connected to a reference array, each comprising a crossbar array having a set of conductive row wires and a set of conductive column wires intersecting the set of conductive row wires, and crosspoint devices at intersections of the set of conductive column wires and the set of conductive row wires in each of the weight array and the reference array;
applying repeated voltage pulses to the crosspoint devices in the weight array until all of the crosspoint devices in the weight array converge to their own symmetry point;
copying conductance values for each crosspoint device from the weight array to the reference array; and
zero-shifting outputs of the weight array by zero-weight values from the reference array by applying a same signal to both the weight array and the reference array, and subtracting the output of the weight array from output of the reference array.

16. The method of claim 15, wherein the voltage pulses applied to the crosspoint devices in the weight array comprise up and down voltage pulses.

17. The method of claim 16, wherein the up and down voltage pulses are applied randomly to the crosspoint devices in the weight array.

18. The method of claim 16, wherein the up and down voltage pulses are applied to the crosspoint devices in the weight array in an alternating manner.

* * * * *